US005647935A

United States Patent [19]

Hoshino et al.

[11] Patent Number: 5,647,935

[45] Date of Patent: Jul. 15, 1997

[54] METHOD OF PRODUCING INK JET RECORDING MEDIUM

[75] Inventors: Mitsuhide Hoshino; Yasushi Umeda; Masahide Takano, all of Higashimatsuyama, Japan

[73] Assignee: Nippon Paper Industries Co., Ltd., Tokyo, Japan

[21] Appl. No.: 571,303

[22] Filed: Dec. 12, 1995

[30] Foreign Application Priority Data

Dec. 14, 1994 [JP] Japan .................................... 6-333019

[51] Int. Cl.$^6$ ...................................................... B32B 31/12

[52] U.S. Cl. .......................... 156/231; 156/232; 156/238; 156/241

[58] Field of Search .................................... 156/231, 232, 156/238, 241

[56] References Cited

U.S. PATENT DOCUMENTS

| | | | |
|---|---|---|---|
| 3,471,357 | 10/1969 | Bildusas . | |
| 4,388,137 | 6/1983 | McCarty | 156/275.5 |
| 4,992,129 | 2/1991 | Sasaki | 156/240 |
| 5,143,570 | 9/1992 | Freedman | 156/230 |
| 5,350,474 | 9/1994 | Yamane | 156/240 |
| 5,397,677 | 3/1995 | Schuerwegen | 430/256 |
| 5,400,126 | 3/1995 | Cahill | 355/278 |
| 5,483,321 | 1/1996 | Cahill | 355/200 |

*Primary Examiner*—Jenna Davis
*Attorney, Agent, or Firm*—Oblon, Spivak, McClelland, Maier & Neustadt, P.C.

[57] ABSTRACT

Disclosed is a method of producing ink jet recording medium provided with an ink-receiving layer having porous inorganic composition as a major component, characterized in that the ink-receiving layer having porous inorganic composition as a major component is coated onto a transferring substrate provided with release treatment, if need be, said ink-receiving layer and a recording substrate that will become a final supporter of ink jet recording medium are adhered with an adhesive, and then the transferring substrate is peeled off, thereby forming a surface of ink-receiving layer replicated the surface shape of said transferring substrate onto the recording substrate. The surface gloss of ink-receiving layer can be adjusted easily.

2 Claims, 2 Drawing Sheets

METHOD OF PRODUCING INK JET RECORDING MEDIUM

BACKGROUND OF THE INVENTION

The present invention relates to a method of producing ink jet recording medium that uses a coating liquor for ink-receiving layer having porous inorganic composition as a major component. In more detail, it relates to a method of producing ink jet recording medium that allows to arbitrarily adjust the surface gloss of ink-receiving layer of ink jet recording medium.

The ink jet recording system, which lets fly fine droplets of ink by different action principles and allows them to attach onto the recording media such as paper to record images, letters, etc., is spreading rapidly over various applications, because of high speed, low noise, easy multi-coloration and additionally unnecessity of development and fixation. Moreover, the images to be formed by multicolor ink jet system make it possible to afford comparable records compared even with multicolor prints by graphic arts system and printed pictures by color photograph system, and, in the use for making small number of copies, they are being applied widely even to the area of full color image recording, because of lower cost than those by photographic technologies.

Efforts have been made from the aspects of device and ink composition to use fine paper and coated paper used for usual printing and writing as the recording media to be used in said ink jet recording system. However, with the improvement in the performance of ink jet recording device such as higher speed, high preciseness or full coloration and the expansion of uses, higher characteristics have become to be required also for the recording media. Namely, as the recording media, those that the dot density of ink is high and the color tone is bright and vivid, that the absorption of ink is fast and the ink does not flow out or blur even when ink dots are superposed, and that the diffusion of ink in the lateral direction is not so much over the necessity and the periphery is smooth and does not become hazy, are required.

For solving these problems, some proposals have been presented so far. For example, in Japanese Unexamined Patent Publication No. Sho 52-53012, an ink jet recording paper with surface-converting coating provided on a low-sized base stock is disclosed, and, in Japanese Unexamined Patent Publication No. Sho 5349113, an ink jet recording paper with water-soluble high-molecular material impregnated into a sheet with urea-formalin resin powder added internally is disclosed. These ink jet recording papers of general paper type show fast ink absorption, but have drawbacks that the periphery of dots tends to become hazy and the dot density is also low.

Moreover, in Japanese Unexamined Patent Publication No. Sho 55-5830, an ink jet recording paper with ink-absorptive coating layer provided on the surface of supporter is disclosed, and, in Japanese Unexamined Patent Publication No. Sho 55-51581, an example that uses silica powder as a pigment in covering layer is disclosed. These ink jet recording papers of coated paper type show more improvement in the points of dot diameter, dot shape, dot density and reproduction of color tone that those of ink jet recording papers of general paper type, but, since the ink to be applied to these recording media is most often an aqueous ink using water-soluble dye, they have a problem that, when water etc. splash on the image formed on the recording media, the dye dissolves out again and exudes to remarkably lower the worth of recorded matter. So, for improving this drawback, Japanese Unexamined Patent Publication No. Sho 60-232990 disclosed an ink jet recording medium with porous cationic hydrated aluminum oxide allowed to contain in said ink-receiving layer, resulting in improved water resistance etc. This is paying an attention to the porosity of hydrated aluminum oxide and aims at taking the liquid substances such as ink and water into pores.

There, nowadays, the surface gloss of ink jet recording medium includes a variety of types from low gloss of general paper type to high gloss that replaces the photographic paper in color photography system or aims at the feeling of high quality for printed (recorded) image, which are chosen to suit the uses. As the means to achieve high-gloss surface, a method of obtaining high-gloss surface by passing between heated and pressurized roll nips of supercalender etc., a method of pressing the ink-receiving layer against heated mirror face in the wet state for drying (cast process referred to so in the production method of coated paper) as in Japanese Unexamined Patent Publication No. Hei 6-79967, and the like are disclosed.

However, with the ink jet recording medium with porous inorganic composition (e.g. species of alumina and silica) coated directly onto the supporter to form coated film as an ink-receiving layer, it is difficult to achieve high gloss surface by the methods as described above. That is, by the supercalender method, the effect for making high gloss is low because of hard coated film itself and the pores created with considerable effort end up to be collapsed, resulting in decreased ink absorption. In the case of cast process, there exist many restrictions in the viscosity, solids concentration, etc. of coating liquor to be applied onto the substrate to form the ink-receiving layer, so it is difficult in principle to increase the amount capable of coating. That is, the inorganic composition such as alumina sol extremely increases the viscosity at high solids concentration causing inconvenience as a coating liquor, hence it has the greatest defect that does not allow to increase the thickness of ink-receiving layer. For this reason, only thin ink-receiving layer can be formed, making it impossible to obtain good image quality. Moreover, when attempting to produce a plurality of ink jet recording media with different surface glosses, cast drums corresponding to respective glosses are required, leading to immense expenditure in the investment for installation.

The purpose of the invention is to provide a method of producing ink jet recording medium capable of easily and inexpensively creating an arbitrary gloss surface without injuring the image qualities (such as high dot density of ink, bright and vivid color tone, fast ink absorption and no flowing-out or blurring of ink), in the recording medium for recording with ink that uses a coating liquor for ink-receiving layer having porous inorganic composition as a major component.

SUMMARY OF THE INVENTION

As a method of accomplishing the purpose aforementioned, the inventors have found a method of producing ink jet recording medium provided with an ink-receiving layer having porous inorganic composition as a major component, characterized in that the ink-receiving layer having porous inorganic composition as a major component is coated onto a transferring substrate provided with release treatment, if need be, said ink-receiving layer and a recording substrate that will become a final supporter of ink jet recording medium are adhered with an adhesive, and then the transferring substrate is peeled off, thereby forming a surface of ink-receiving layer replicated the surface shape of said transferring substrate onto the recording substrate. In addition, they have also found a method of producing ink jet recording medium characterized that, as the adhesive to adhere the ink-receiving layer on transferring substrate and the recording substrate, the coating liquor for ink-receiving layer having porous inorganic composition as a major component is used, thereby adhering the ink-receiving layer formed on the transferring substrate and the recording substrate by wet-lamination method.

DETAILED DESCRIPTION OF THE INVENTION

In following, the invention will be illustrated in more detail.

Figure 1A:
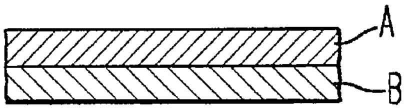
FIG. 1 is a roughly illustrating diagram to show a practical embodiment of the invention.
Figure 1B:
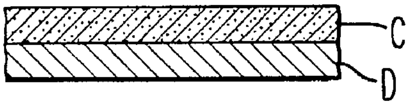
Figure 1C:
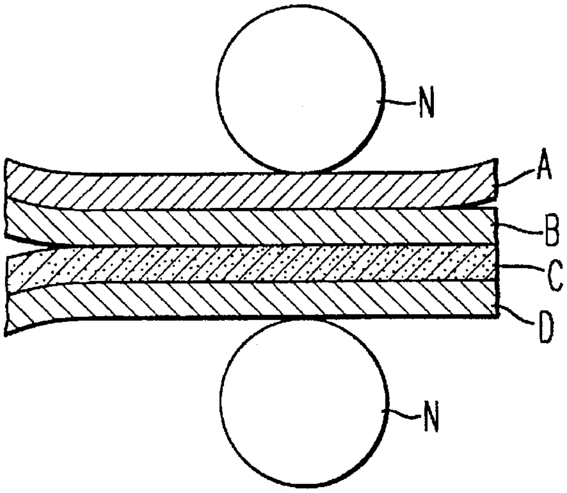
Figure 1D:
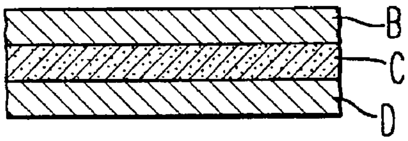
Figure 2A:
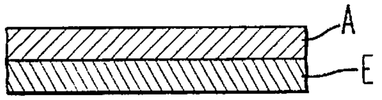
FIG. 2 is a roughly illustrating diagram to show another practical embodiment of the invention.
Figure 2B:
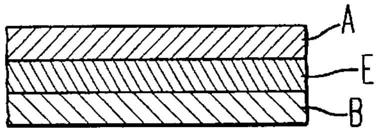
Figure 2C:
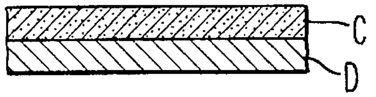
Figure 2D:
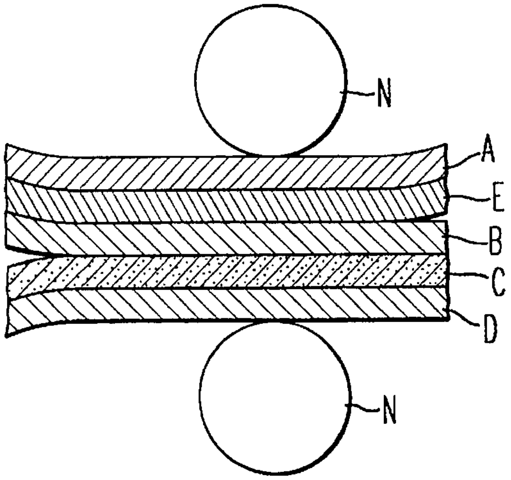
Figure 2E:
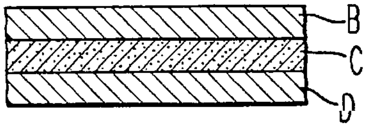

FIG. 1 and FIG. 2 schematically show some methods of producing ink jet recording medium capable of forming arbitrary gloss surface in due step, but the invention is not confined to these.

In FIG. 1 and FIG. 2, A indicated transferring substrate, B; ink-receiving layer, C; adhesive layer to transfer the ink-receiving layer onto image-receiving substrate D and D; recording substrate to become a final supporter of ink jet recording medium. Moreover, E indicates gloss-adjusting release layer capable of arbitrarily and simply adjusting the surface gloss of ink-receiving layer by forming it on the transferring substrate, if need be.

The transferring substrate A of the invention is an intermediate material to produce the ink jet recording medium and an important element to adjust the gloss of ink-receiving layer. As the transferring substrates, a variety of substrates such as plastic films (various film like polyethylene, polypropylene and poly(ethylene terephthalate)), resin film sticked onto the surface of paper, and so-called laminate paper converted with molten resin can be utilized. Moreover, paper provided with release treatment by melamine resin or silicone resin, which is ordinarily called processing paper, can also be used as a transferring substrate.

As the substances to form the ink-receiving layer B, for example, those that were made to be film-like by drying porous oxide sols (e.g. silica sol, alumina sol, zirconia sol and titania sol) can be mentioned. Moreover, various additives such as pigment dispersant, thickening agent, leveling agent, antifoamer and form inhibitor, fluorescent brightening agent, coloring dye and coloring pigment can also be formulated.

The adhesives for C can include sticking agents as well as adhesives so said ordinarily. And, as their components, a variety of types such as acrylic resin, ethylene-vinyl acetete (EVA) resin, polyester resin, epoxy resin and urethane resin can be mentioned. Moreover, poly(vinyl alcohol) (PVA), poly(vinyl-pyrrolidone) (PVP), etc., which are difficult to transfer by applying heat and pressure under ordinary conditions, to say nothing of having adhesiveness in the state of dried film, can also be converted to adhesives by utilizing wet-lamination method, wherein they are dissolved into water etc. and the ink-receiving layer and the recording substrate are sticked by using them in the state of solution, then followed by drying.

Furthermore, if employing this wet-lamination method, the coating liquor itself for forming ink-receiving layer B can also be used as an alternative to adhesive. In particular, when using porous inorganic composition, for example, alumina sol as an adhesive, the dye component of ink can be fixed (retained) in alumina layer being the ink-receiving layer and water, alcohol, etc. being the solvents of ink can be absorbed into the recording substrate (paper), hence there is a benefit capable of aiming at the thinning of ink-receiving layer. At this time, the coating weight after dried the ink-receiving layer to be coated onto the transferring substrate is preferable to be 5 g/m$^2$ or more in relation to the surface gloss of ink-receiving layer after transfer. Moreover, the forming liquor of ink-receiving layer B having a role of adhesive to be coated onto the recording substrate is preferable to have a coating weight of 5 g/m$^2$ or more after drying in view of the adhesive.

The recording substrate D is a final supporter of ink jet recording medium, and paper and besides a variety of substrates such as plastic films (various films like polyethylene, polypropylene and poly(ethylene terephthalate), resin film sticked onto the surface of paper and so-called laminate paper converted with molten resin can be utilized.

Moreover, for making the surface of ink-receiving layer of ink jet recording medium arbitrary gloss surface, the release layer E can be formed on the transferring substrate, if need be. As the substances to form this release layer, polyacrylic ester and acrylic ester copolymer, polymethacrylic ester and methacrylic ester copolymer, polyacrylamide and acrylamide copolymer, poly(vinyl acetate) and vinyl acetate copolymer, poly(vinyl chloride) and vinyl chloride copolymer, poly(vinylidene chloride) and vinylidene chloride copolymer, polystyrene and styrene copolymer, ethylene with vinyl acetate, ethylene with acrylic ester, ethylene with vinyl chloride, poly(vinyl acetal) resins such as poly(vinyl butyral) and poly(vinyl formal), polyester resins, polyamide resins such as nylon and copolymerized nylon, polyolefins such as polyethylene and polypropylene, cellulose derivatives, shellac, melamine resin, epoxy resin, urethane resin, silicone resin, etc. are mentioned. And, by adding various pigments with a variety of particle diameters such as silicon oxide, calcium carbonate, titanium oxide and aluminum oxide and resin powders such as plastic pigment, the smoothness can be adjusted so as to achieve the arbitrary desired surface gloss of ink-receiving layer. Furthermore, surfactants, silicone component substances and fluoro compounds, which are referred to as release agents, and various additives such as pigment dispersant, thickening agent, leveling agent, antifoamer and form inhibitor, fluorescent brightening agent, coloring dye and coloring pigment as other additives can also be formulated.

For the methods of forming coasted films of ink-receiving layer and adhesive layer of the invention, ordinary coating methods by blade coater, air-knife coater, roll coater, curtain coater, bar coater, gravure coater, spray equipment, etc. are employed. And, as the drying methods for coated film, methods of drying and solidifying by hot air, infrared rays, etc. are used.

As the methods of producing ink jet recording medium in the invention, FIG. 1 shows a method, wherein the ink-receiving layer B is formed by drying and solidifying on the transferring substrate A (step 1), then the adhesive layer C is formed on the recording substrate D (drying and solidification are not necessarily required) (step 2), the face of ink-receiving layer B and the face of adhesive layer C are joined so as to come in contact with each other and then passed through rolls with pressure or pressure and heat applied, thereby adhering the ink-receiving layer B and the recording substrate D (step 3), and the transferring substrate A is peeled off, thereby forming an ink-receiving layer replicated the high-gloss surface of transferring substrate onto the recording substrate (step 4). Moreover, as shown in FIG. 2, by forming the release layer E adjusted to an arbitrary desired surface smoothness on the transferring substrate, an ink-receiving layer with desired gloss can be obtained.

For illustrating the invention in more detail, examples will be shown, but the invention is not confined to these. Besides, part and % shown in the examples mean part by weight and % by weight, respectively.

The values of physical properties in the examples were measured with following knacks.

The printing instrument used was an ink jet printer (Pixcel Jet) from Canon Inc. and, for the inks, cyan (C), magenta (M), yellow (Y) and black (BK) being pure inks designated by the maker were used.

The thickness of ink-receiving layer was measured actually according to JIS P8118.

The gloss (surfaces of transferring substrate and ink-receiving layer) was measured actually (incident angle of light: 60°) with gloss meter GM-3D (from Murakami Color Technology Lab.) according to JIS Z8741.

For the measurement of ink absorption velocity, solid recordings of cyan, magenta and yellow were made simultaneously onto the same place of a square of 30 mm×30 mm to create (record) a 3-color mixed black area. And, immediately after the recordings (ca. 3 seconds), this was contacted with a paper press roll to evaluate visually at 5 levels (numeral 5 is best) whether the stains appeared or not.

For the measurement of ink absorption capacity (boundary blur), mixed blue areas of cyan and magenta and mixed red areas of magenta and yellow were created (recorded) side by side leaving no space between squares of 30 mm×30 mm, and it was evaluated visually at 5 levels (numeral 5 is best) how much the boundaries between blue areas and red areas were blurring.

For the measurement of dot diameter, magenta ink was printed by one dot, and it was measured actually under microscope how the dot diameter changed, that is, blurred in the ink-receiving layer.

EXAMPLE 1 AND EXAMPLE 2

For the transferring substrate A, a 50 μm thick poly (ethylene terephthalate) film (Tetron S type from Teijin Ltd.) available usually in the market was used.

The coating liquor for forming the ink-receiving layer B was prepared as follows: The porous hydrated aluminum oxide was made with following knack. Both 3130 parts of aluminum sulfate solution containing 8% $Al_2O_3$ and 2080 parts of sodium aluminate solution containing 26% $Al_2O_3$ were poured simultaneously into 11250 parts of water under stirring to precipitate alumina hydrogel at pH of 7.0 to 7.5. Then, excess of sodium aluminate was added to adjust pH to 10.5 and the alumina hydrogel was filtered and washed at pH of 10.5 to remove sodium and sulfate. This cake was redispersed and filtered at pH of 7 to 8 to decrease sodium content to 0.1% or less. The cake thus obtained was reslurried at a concentration of 10% and dried with spray dryer at an inlet temperature of 180° C. to obtain xerogel with an average particle diameter of 4 μm. An aqueous dispersion at a concentration of 20% comprising 20 parts of said hydrated aluminum oxide obtained in this way and 2 parts of oxidized starch (MS3800, from Nihon Shokuhin Kako Co., Ltd.) was used as a coating liquor for the ink-receiving layer. And, the coating was made with roll coater so as the coating weight of ink-receiving layer after drying and solidification to become 15 g/m$^2$ in Example 1 and 20 g/m$^2$ in Example 2, respectively, following by drying and solidification with hot air.

The adhesive layer C-forming liquor was prepared as follows: As an adhesive C-1 for dry lamination used in Examples 1 and 2, a 3% aqueous solution of poly(ethylene oxide) (PEO-1, from Sumitomo Seika Chemicals Co., Ltd.) was used for coating liquor. And, this was coated onto the recording substrate with roll coater so as to become 6 g/m$^2$ after drying and solidification, followed by drying with hot air.

For the recording substrate D, Excellent Form with 127.9 g/m$^2$ (from Nippon Paper Industries Co., Ltd.) being general fine paper was used.

Using the materials as described above, first the ink-receiving layer B was formed on the transferring substrate A, then the adhesive layer C was formed on the recording substrate, and thereafter the face of the ink-receiving layer B and the face of the adhesive layer C were joined so as to come in contact each other, which was then passed through rolls with pressure and heat applied, thereby adhering the ink-receiving layer B and the recording substrate D. And, the transferring substrate A was peeled off to make an ink jet recording medium with high-gloss ink-receiving layer created by replicating the highly smooth surface shape of transferring substrate onto the recording substrate.

EXAMPLE 3 THROUGH EXAMPLE 7

As the transferring substrate A, a 50 μm thick poly (ethylene terephthalate) film (Tetron S type from Teijin Ltd.) available usually in the market was used after having formed the gloss-adjusting release layer E beforehand.

The release layer E-forming liquor for adjusting gloss was prepared as follows: A coating liquor comprising 30 parts of polyester resin solution (Thermolac F-1, solids concentration 30%, from Soken Kagaku Co.), 30 parts of toluene, 20 parts of MEK and 20 parts of cyclohexanone was coated onto the transferring substrate with roll coater so as the dry solids to become 2 g/m$^2$, followed by drying with hot air. Moreover, for adjusting the gloss, coating liquors with 0%, 0.5%, 1.0%, 2.0% and 4.0% of silica (Mizukasil R-527H, from Mizusawa Industrial Chemicals Ltd.) formulated into said release layer-forming liquor for adjusting gloss were used in Examples 3 through 7, respectively.

For the coating liquor for forming the ink-receiving layer B, same one as in Example 1 was used. And, the coating was adjusted beforehand with roll coater so as the coating weight of ink-receiving layer after drying and solidification to become 20 g/m$^2$ in combination with adhesive for C.

For the recording substrate D, Excellent Form with 127.9 g/m$^2$ (from Nippon Paper Industries Co., Ltd.) being general fine paper was used.

Using the materials as described above, first the gloss-adjusting release layer E was formed on the transferring substrate A, and further, the coating liquor for forming the ink-receiving layer B was coated onto E and dried. Then, the coating liquor for forming ink-receiving layer B was coated onto the recording substrate D as an adhesive C-2 for wet lamination, and this was superposed onto the ink-receiving layer B provided on the transferring substrate A interposing the gloss-adjusting release layer E in the state of C-2 being wet, which was then passed through rolls with pressure applied and then dried with hot air, thereby adhering the ink-receiving layer B and the recording substrate D. And, the transferring substrate A was peeled off the make an ink jet recording medium with high-gloss ink-receiving layer created by replicating the highly smooth surface shape of transferring substrate onto the recording substrate.

COMPARATIVE EXAMPLES 1 THROUGH 4

The same coating liquor for the ink-receiving layer (B) as in Example 1 was coated onto Excellent Form with 127.9 g/m$^2$ (from Nippon Paper Industries Co., Ltd.) being general fine paper with roll coater so as the coating weight of ink-receiving layer after drying and solidification to become 20 g/m$^2$, which was then dried and solidified with hot air. And, supercalender treatments were conducted under no treatment and under linear pressures of 10 kg/cm$^2$, 20 kg/cm$^2$ and 40 kg/cm$^2$ to obtain ink jet recording media, which were designated to Comparative examples 1 through 4, respectively.

COMPARATIVE EXAMPLE 5 AND COMPARATIVE EXAMPLE 6

The same coating liquor for the ink-receiving layer (B) as in Example 1 was coated onto Excellent Form with 127.9 g/m$^2$ (from Nippon Paper Industries Co., Ltd.) being general fine paper with roll coater, then this coated layer was pressed against a heated mirror face in the wet state for drying (cast process referred to so in the production method of coated paper), manipulating the coating weights of ink-receiving layer to become 10 g/m$^2$ and 15 g/m$^2$, which were designated to Comparative examples 5 and 6. However, although the ink-receiving layer was formed stably with coating weight of 10 g/m$^2$, the production was impossible with coating weight of 15 g/m$^2$.

The results above are shown in Table 1.

TABLE 1

Evaluation of each example and comparative example

| | Thickness of ink-receiving layer (μm) | Gloss (%) Transferring substrate | Gloss (%) Ink receiving layer | Ink absorption Velocity | Ink absorption Blur | Dot diameter (μm) | Remarks |
|---|---|---|---|---|---|---|---|
| Example 1 | 15 | 95 | 55 | R = 4 | R = 4 | 100 | Follow FIG. 1 (No release layer) |
| Example 2 | 20 | 95 | 70 | R = 5 | R = 5 | 90 | Follow FIG. 1 (No release layer) |
| Example 3 | 20 | 95 | 70 | R = 5 | R = 5 | 90 | Follow FIG. 2 (No pigment addition to release layer) |
| Example 4 | 20 | 80 | 50 | R = 5 | R = 5 | 90 | Follow FIG. 2 (Pigment in release layer 0.5%) |
| Example 5 | 20 | 60 | 40 | R = 5 | R = 5 | 90 | Follow FIG. 2 (Pigment in release layer 1.0%) |
| Example 6 | 20 | 40 | 30 | R = 5 | R = 5 | 90 | Follow FIG. 2 (Pigment in release layer 2.0%) |
| Example 7 | 20 | 20 | 20 | R = 5 | R = 5 | 90 | Follow FIG. 2 (Pigment in release layer 4.0%) |
| Comparative example 1 | 20 | — | 30 | R = 5 | R = 5 | 90 | Supercalendar treatment None |
| Comparative example 2 | 20 | — | 30 | R = 4 | R = 4 | 95 | Supercalendar treatment 10 kg |
| Comparative example 3 | 20 | — | 33 | R = 3 | R = 3 | 100 | Supercalendar treatment 20 kg |
| Comparative example 4 | 20 | — | 40 | R = 1 | R = 1 | 140 | Supercalendar treatment 40 kg |
| Comparative example 5 | 10 | — | 30 | R = 2 | R = 2 | 160 | Cast process |
| Comparative example 6 | 15 | Production impossible | ← | ← | ← | ← | Cast process |
| | JISP8118 | JISZ8741 | JISZ8741 | Visual evaluation | | | |

In all of Example 1 through Example 7, ink jet recording media with excellent image quality and desired arbitrary surface gloss of ink-receiving layer could be obtained easily and inexpensively.

Comparative example 1 through Comparative example 4 show good image quality, but it is difficult to obtain arbitrary gloss only with supercalender treatment. Moreover, if the treatment pressure is increased aiming at high gloss, then the ink absorption property ends up to decrease. This is considered due to collapsed pores. Furthermore, with the cast process in Comparative example 5 and Comparative example 6, good image quality could not be obtained because of the restriction in providing thick ink-receiving layer.

As described above, in accordance with the production method of the invention, an ink-receiving layer with arbitrary gloss could be formed easily and inexpensively without injuring the image quality, in the ink jet recording medium that used the ink-receiving layer having porous inorganic composition as a major component.

What is claimed is:

1. A method of producing an ink jet recording medium provided with an ink-receiving layer having a porous inorganic composition as a major component, comprising the steps of applying as a coating the ink-receiving layer having a porous inorganic composition as a major component onto a transferring substrate provided with or without release treatment so as to provide any required gloss, adhering with an adhesive said ink-receiving layer and a recording substrate that will become a final supporter of an ink jet recording medium, and then peeling off the transferring substrate, thereby forming a surface on the ink-receiving layer which replicates the surface shape of said transferring substrate.

2. The method of producing an ink jet recording medium of claim 1, wherein, a coating liquor for the ink-receiving layer is used as the adhesive to adhere the ink-receiving layer on the transferring substrate and the recording substrate, thereby adhering the ink-receiving layer on the transferring substrate and the recording substrate by a wet-lamination method.

* * * * *